United States Patent [19]

Waggoner

[11] Patent Number: 4,832,413
[45] Date of Patent: May 23, 1989

[54] DEVICE FOR MOUNTING VEHICLE WHEELS

[76] Inventor: Wayne M. Waggoner, P.O. 31357, Billings, Mont. 59107

[21] Appl. No.: 27,483

[22] Filed: Mar. 17, 1987

[51] Int. Cl.$^4$ ............................................. B60B 11/00
[52] U.S. Cl. ............................... 301/9 DN; 301/36 R
[58] Field of Search ................ 301/9 R, 9 DN, 36 R, 301/9 DH

[56] References Cited

U.S. PATENT DOCUMENTS

| | | | |
|---|---|---|---|
| 1,940,675 | 12/1933 | Crowther | 301/36 R X |
| 1,963,229 | 6/1934 | Eksergian | 301/36 R |
| 1,969,193 | 8/1934 | Woodward | 301/36 R |
| 2,049,268 | 7/1936 | Ludwick | 301/36 R X |
| 2,107,925 | 2/1938 | Ash | 301/36 R |
| 2,130,392 | 9/1938 | Horn | 301/36 R X |
| 2,169,047 | 8/1939 | Horn | 301/36 R X |
| 2,217,646 | 10/1940 | Eksergian | 301/36 R |
| 2,388,403 | 11/1945 | Garnett et al. | 301/36 R X |
| 2,844,409 | 7/1958 | Eissergian | 301/36 R |
| 4,094,352 | 6/1978 | Hlinsky | 411/959 X |
| 4,240,670 | 12/1980 | Zorn et al. | 301/36 R X |
| 4,632,464 | 12/1986 | Okamoto et al. | 301/36 R X |

Primary Examiner—Robert B. Reeves
Assistant Examiner—Russell D. Stormer
Attorney, Agent, or Firm—Richard C. Conover

[57] ABSTRACT

An adaptor assembly for use with studs used to mount a wheel to a hub of a truck or other vehicle. The adaptor comprises a cylindrically shaped, partially hollow member which is initially screwed onto the wheel stud having one end abutting the hub or brake drum of the vehicle and completely surrounding the protruding wheel stud. The adaptor assembly having a diameter larger than the diameter of the wheel stud and sized to be slightly less in diameter than the corresponding wheel holes. The wheels of the vehicle are placed over these adaptor assemblies mounted on the wheel studs and a spring washer is then placed over each adaptor. Finally, a wheel nut, being screwed onto the exterior threads of each adaptor, is used to force the spring washer against the wheels being mounted to secure the wheels to the hub of the vehicle.

1 Claim, 3 Drawing Sheets

DEVICE FOR MOUNTING VEHICLE WHEELS

BACKGROUND OF INVENTION

The present invention relates to a wheel mounting assembly for mounting a wheel of a motor vehicle on the hub or brake drum of the vehicle and has particular application for the mounting of wheels to large trucks which carry freight.

In vehicles having demountable wheels, the most common type of fastening means for the wheels includes a series of threaded members such as studs or bolts fixed to the brake drum or hubs on the vehicles. For purposes of illustration, FIG. 1 is included herewith to show this fastening means. This figure is an elevational view with parts broken away showing the conventional mounting assembly. Bolts or studs "B" are arranged in a circle concentric with the axis of the drum or hub "C". An inner vehicle wheel "D" and an outer vehicle wheel "E" are provided with a series of countersunk holes "F" for receiving the studs or bolts. In the most common type of wheel mount in use today, the countersunk holes "F" are doubly beveled. The wheel is placed on the studs when the wheel is to be secured in place. Next a centering device "G", which consists of a partially hollow nut assembly having threads on the inside to be received by the stud and having threads on the outside to receive the wheel nut, is then screwed on the stud. This centering device "G" has an integral nut "H" formed at one end thereof and at the other end thereof has a doubly beveled portion "I" extending outwardly from the device. The bevel surface furthest from the nut "H" engages the outer bevel surface of the stud receiving hole "F" of the inner wheel "D". As this centering nut assembly is screwed onto the stud, the beveled portion of the centering device engages the corresponding beveled portion of the stud receiving holes of the wheel and centers the wheel on the studs. Once the threaded centering assembly has been screwed tight on the stud, the second wheel assembly is mounted over the centering nut. The other beveled surface of the centering nut engages the inner beveled surface of the stud receiving hole in the outer wheel to center the outer wheel on the studs. Next a wheel nut "J" is then threaded onto the centering device to secure the second wheel to the hub. This wheel nut "J" has a beveled surface which engages the outer bevel surface of the outer wheel. When this nut is screwed tightly in place, the wheels are centered and securely held to the hub.

A major disadvantage of this type of assembly for securing the dual wheels to the hub include the problem that the centering device "G" is held away from the hub "C". Thus the weight of the vehicle load is transmitted to the wheels from a position on the stud spaced from the hub as shown in FIG. 1. This arrangement causes severe shearing stresses on the studs and in fact it is not unusual for these studs to shear, causing a dangerous situation for drivers or bystanders when the truck is moving down a highway at high speeds under heavy loads. This problem in the past has caused tremendous expense for truck operators in maintaining vehicles having this type of wheel mounting structure.

Secondly, by having the bevel of the centering device being the device for transmitting the load of the truck to the wheel, there is tremendous pressures placed on these beveled surfaces. These pressures have caused breakage of the wheels themselves. The wheels crack and shear from these pressures, again causing extensive maintenance problems for truck operators.

This has long been a recognized problem in the United States. In some foreign countries such as in Europe, it has been the practice to increase the diameter of the lug size or decrease the diameter of the wheel holes so that the wheels more closely fit on the studs of the wheel to minimize this problem. Further, a spring washer has been used between the outer wheel and the wheel nut to minimize shearing forces on the beveled surfaces of the stud receiving holes in the wheels. This has reduced the problem to such an extent that some manufacturers in the United States have been going to this system for mounting wheels to hubs. However, at the present time, a great majority of the trucks on the road today use the older system described above, which has the associated problems also discussed above. With these trucks, it is believed to be too expensive to convert the older trucks to the new design.

The present invention is directed to a retrofitting device to be used with the older stud and wheel design to make the wheel mounting assembly a much safer and economical assembly than has heretofore been possible and specifically to overcome the problems described above.

SUMMARY OF THE INVENTION

The present invention includes an adaptor assembly which includes a partially hollow member similar in some respects to the centering device previously used without the double bevel centering portion. The diameter of the adaptor assembly is selected to be approximately the same diameter as the wheel holes. Further, with this assembly, the adaptor is screwed completely down to the hub of the vehicle and is actually screwed onto the studs of the vehicle prior to mounting the wheels. In a preferred embodiment, this adaptor assembly has a serrated edge portion on the bottom surface abutting the wheel hub to securely hold this adaptor in place. As said above, this adaptor does not have the centering double beveled portion of the centering devices used in the past. Once this adaptor has been securely mounted on the studs of the vehicle, the wheels are simply placed on these adaptor assemblies as before when the wheels were placed on the studs mounted to the hub. When the two wheels are thus positioned, a spring washer is then placed over the adaptor and a wheel nut used to force the spring washer against the two wheels. In this manner, the two wheels are securely mounted to the hub of the vehicle and the problems of shearing the studs is eliminated for the reason that there are no leverage forces placed on the wheel stud at a position spaced away from the hub, as in conventional units.

Secondly, since beveled surfaces of a conventional centering device are not used, the problem of cracking the wheels is substantially minimized.

DESCRIPTION OF THE DRAWINGS

In order that the invention may be clearly understood and readily carried into effect, a preferred embodiment will now be described by way of example only, with reference to the accompanying drawings wherein.

DESCRIPTION OF A PREFERRED EMBODIMENT

Figure 1:
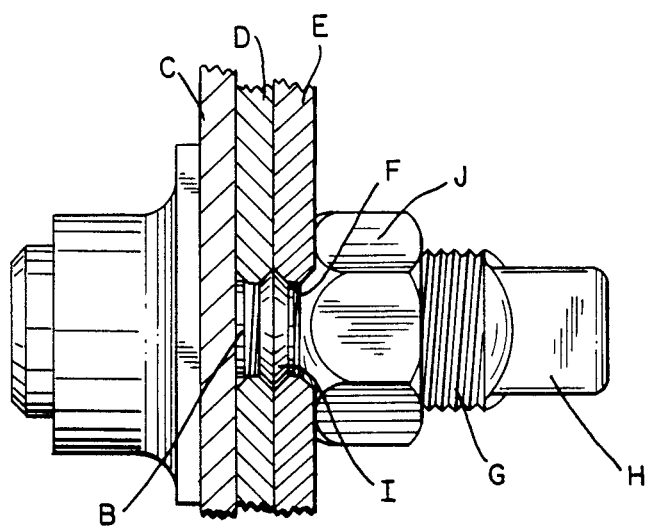
FIG. 1 is an elevational view with parts broken away showing a conventional mounting assembly.
Figure 2:
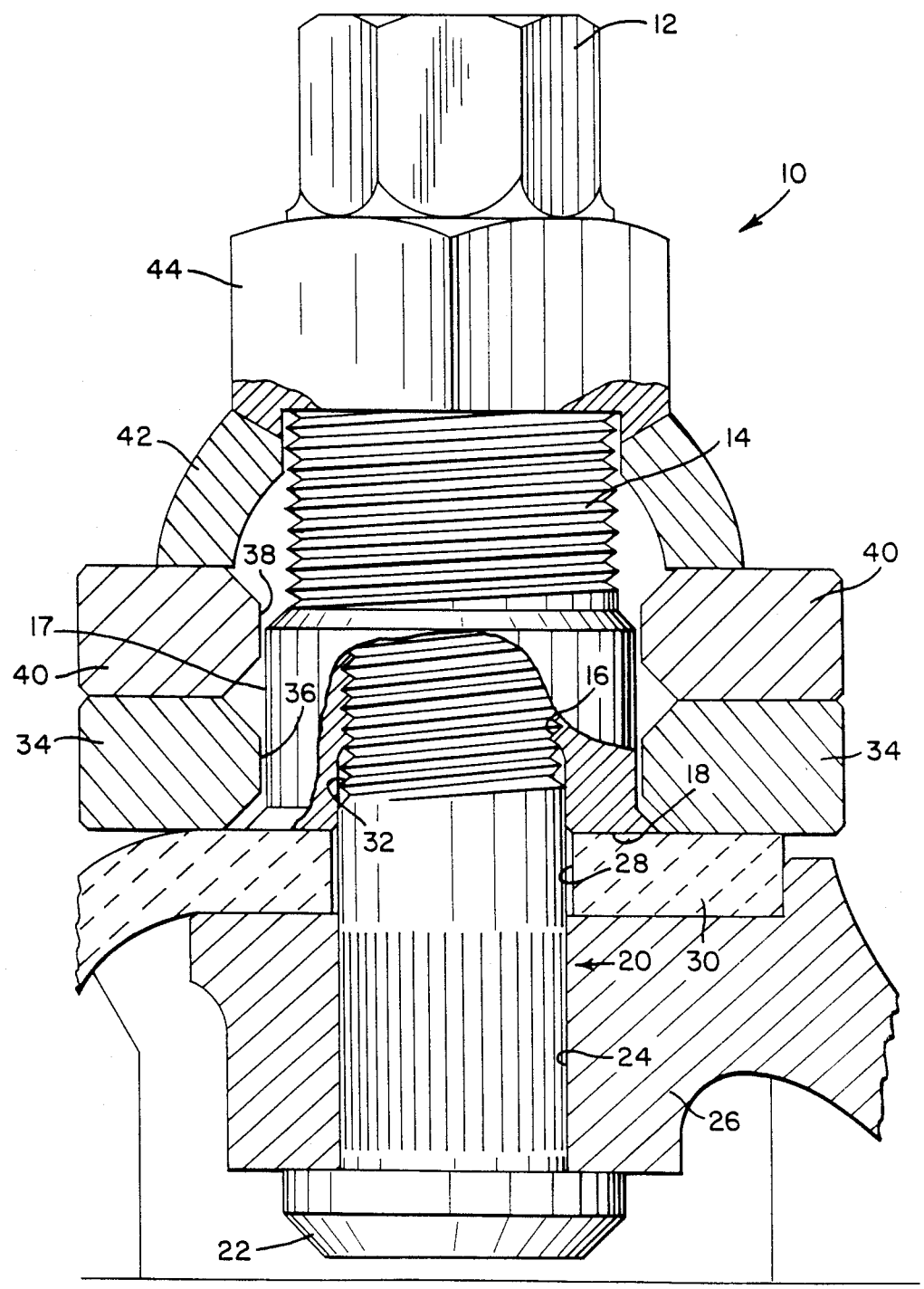
FIG. 2 is an elevational view, partially in section, with parts broken away showing the adaptor and washer assembly according to the present invention.
Figure 3:
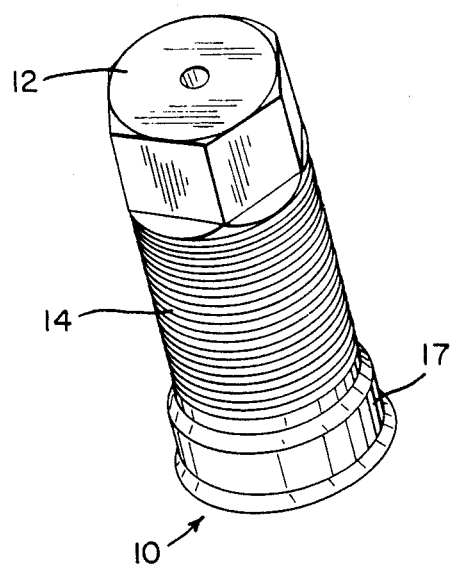
FIG. 3 is a perspective view of the adaptor according to the present invention.
Figure 4:
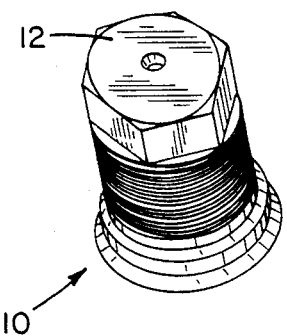
FIG. 4 is a top perspective view of the adaptor according to the present invention.
Figure 5:
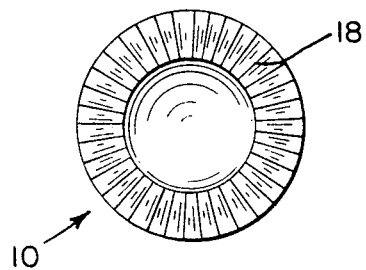
FIG. 5 is a bottom view of the adaptor according to the present invention.

The invention according to the present invention is shown in FIGS. 2 through 5. The invention includes an adaptor 10 which includes an outer nut portion 12 integrally formed thereon, an outer threaded portion 14 and an inner threaded portion 16, as shown in FIG. 2. The adaptor 10 further includes a cylindrical wheel engaging surface 17. In a preferred embodiment, the end of the adaptor opposite the nut 12 has a serrated edge 18 used to firmly secure the adaptor to a hub assembly 26, as will be described subsequently.

The adaptor is used in conjunction with a conventional stud 20 which has a head portion 22 and which extends through a bore 24 in hub assembly 26 and further through a bore 28 in brake drum 30. This stud 20 has a threaded outer portion 32 as shown in FIG. 2.

In using this device, the adaptor 10 is threaded on the threads 32 of stud 20 until the serrated end 18 abuts the brake drum 30. This adaptor 10 is then tightened in place with a wrench being applied to the nut portion 12 of the adaptor 10.

Once this has been accomplished, the inner wheel 34 is then placed on the adaptor 10 with the holes 36 of the inner wheel 34 aligned with the studs 20 mounted on the hub 26. The diameter of the wheel engaging surface 17 is sized to closely match the diameter of the holes 36. Next, the outer wheel is placed adjacent the inner wheel and again the corresponding holes 38 of the outer wheel 40 are aligned with the adaptor assemblies 10 now secured to the hub 26.

Next a spring washer 42 is placed over the adaptor 10 as shown in FIG. 2 and an outer wheel nut 44 is threaded on the outer threads 14 of the adaptor 10 and is securely tightened onto the washer 42. In this manner, the inner and outer wheels are securely mounted to the hub 26 of the vehicle.

With this arrangement, there is very little shearing stress on the studs 20 for the reason that the adaptor completely surrounds the stud 20 and in fact abuts the brake drum 30. Further, there is little stress on the beveled portions of the inner and outer wheels since they closely fit against the wheel engaging surface 17 of the adaptor 10. The weight of the truck is then transmitted to the wheels through the wheel engaging surface 17 acting directly against the outer edge of the beveled surfaces formed in the holes of the wheel and not in a shearing manner as has heretofore been used. The wheels are properly centered on the studs and are securely held against the brake drum through the wheel nut 44 acting through the spring washer 42. Thus the two problems of shearing the studs and the cracking of wheels is substantially reduced in an inexpensive manner.

While the fundamental novel features of the invention have been shown and described, it should be understood that various substitutions, modifications and variations may be made by those skilled in the art without departing from the scope of the invention. Accordingly, all such modifications and variations are included in the scope of the invention as defined by the following claims:

I claim:

1. A wheel mounting assembly for mounting a single vehicle wheel or an inner wheel and an outer vehicle wheel, each wheel having a circle of round mounting holes therein onto a circle of vehicle mounting studs secured to a vehicle hub comprising:

an adaptor assembly comprising a cylindrical elongate member having an internally threaded bore at one end thereof for cooperating with a threaded wheel mounting stud, which member is adapted to be screwed entirely onto the stud and to abut the vehicle hub;

the elongate member having an integral nut formed at an end opposite to the end cooperating with the threaded wheel mounting stud;

the elongate member further having a smooth cylindrically shaped wheel engaging surface located adjacent the end cooperating with the threaded mounting stud for closely fitting inside the inner surface of the corresponding wheel hole of the inner wheel and closely fitting inside at least a portion of the corresponding wheel hole of the outer wheel whereby the elongate member supports the inner and outer wheels on the mounting studs;

the elongate member further having external threads to mate with a corresponding wheel bolt used to secure the wheel to the hub;

the wheel mounting assembly further including a spring washer having a truncated conical shape with the base portion of the washer abutting the wheel surface adjacent the hole in the outer wheel and the other end of the washer being engaged by the wheel bolt to secure the wheel to the hub.

* * * * *